United States Patent [19]

Arai et al.

[11] 4,303,948
[45] Dec. 1, 1981

[54] IMAGE TRANSCRIBING SYSTEM

[75] Inventors: Yoshio Arai; Hiroyuki Kataoka; Isao Suzuki; Shozo Yokota, all of Ebina, Japan

[73] Assignee: Fuji Xerox Co., Ltd., Tokyo, Japan

[21] Appl. No.: 74,459

[22] Filed: Sep. 11, 1979

[30] Foreign Application Priority Data

Sep. 14, 1978 [JP] Japan .................. 53-113318

[51] Int. Cl.³ ........................................... H04M 1/04
[52] U.S. Cl. ..................................... 358/287; 358/903
[58] Field of Search ............... 358/287, 285, 258, 138, 358/903; 344/815

[56] References Cited
U.S. PATENT DOCUMENTS 4,196,450  4/1980  Miller et al. .................. 358/256

Primary Examiner—Robert L. Richardson
Assistant Examiner—Edward L. Coles
Attorney, Agent, or Firm—Sughrue, Mion, Zinn, Macpeak & Seas

[57] ABSTRACT

An image transcribing system for transferring an image from an original document to a recording sheet in which the original image is scanned, converted to binary signals and stored in a first page memory. An image processing section transfers the image data from the first page memory to a second page memory while it is simultaneously enlarged by a predetermined factor. In the enlargement process, the image data is first enlarged by an integer factor then reduced by a fractional factor in accordance with stored bit patterns corresponding to the required fractional factor.

6 Claims, 16 Drawing Figures

IMAGE TRANSCRIBING SYSTEM

BACKGROUND OF THE INVENTION

The invention pertains to an image transcribing and transferring device in which an image is to be transferred from a first designated region on an original document to a second designated region, a transcribing region, on a recording sheet. More particularly, the invention pertains to such an image transcribing system in which the transferred image is to be enlarged or reduced in size upon transfer.

In the prior art, image transcribing systems have been known in which an image to be transferred is scanned in two direction and the scanned image is converted to binary data which is read back out to control a transcribing or printing device which reproduces the image at the designated transcribing region. One such system is described in U.S. Pat. No. 4,135,212, issued Jan. 16, 1979 to Pugsley et al.

In systems of this general type, it is often desirable to enlarge or reduce the size of the image upon its transfer as well as to select only a portion of an input image for transfer and to reproduce it at a designated location on the recording sheet. In the known system, these tasks have required relatively large amounts of storage capacity as well as large amounts of digital computing circuitry of complex and costly construction.

SUMMARY OF THE INVENTION

Thus, it is an object of the present invention to provide an image transcribing system which is capable of transferring an image from a first designated region on an original document to a second designated transcribing region on a recording sheet.

It is further an object to the invention to provide such an image transcribing system which is capable of an image transcribing system which is capable of enlarging or reducing the image as it is transferred.

Yet further, it is an object of the invention to provide such an image transcribing system in which the size of required memories is kept as small as possible and the required circuitry is simplied and reduced in size from that previously required.

These, as well as other objects of the invention, are met by providing an image transcribing device which scans an original image converting it into binary electrical signals representative thereof. These signals are stored in a first page memory. An image processing section circuit transfers the image thus stored to a second page memory from which the transferred image is read out and transcribed onto the recording sheet. Means may also be provided for observing the image on the original and selecting the region on the recording sheet at which the image is to be transcribed.

The image processing section determines, under operator control, the degree of enlargement or reduction of the transferred image. To this effect, means is provided therein for first enlarging the image stored in the first page memory by a factor of a natural number, preferably an integer equal to the whole part of a desired enlargement ratio plus unity. The image data is then reduced by a fraction so as to obtain the desired enlargement ratio. In the reduction process, bits are removed from the initially enlarged image data in correspondence with the appearance of bits in a selected state in pre-stored patterns corresponding to the fractional reduction required. In a preferred embodiment, two such patterns are provided for each allowed enlargement factor and the two patterns alternated with each other to avoid moire pattern effect.

DETAILED DESCRIPTION OF THE PREFERRED EMBODIMENT

Figure 1:
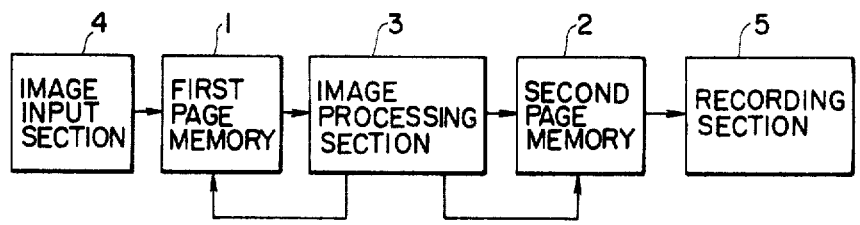
FIG. 1 is a block diagram of a copying system embodying the present invention.

This invention concerns an image transcribing device for transcribing or reproducing (hereinafter referred to simply as transcribing) an image in a region of an original which is to be extracted to a desired position or region on a recording paper.

This invention further relates to an image transcribing device for transcribing an image from a first region on an original document to a desired position on a recording paper while simultaneously enlarging or reducing the image.

This invention is to be described in detail while referring to the drawings.

FIG. 1 is a schematic block diagram of a recording device in which the present invention is used to advantage and a diagram useful for illustrating the principles of the invention. As shown in FIG. 1, a transcribing device of the invention includes an image input section 4 for converting an original image of a document into an image signal. A first page memory 1 is provided for storing the original input image information. An image processing section 3 extracts from the original image information only that portion of the original image information that corresponds to a desired predetermined extraction region A and performs a preset enlarging or reducing operation as required upon the extracted image corresponding to the region A. A second page memory 2 transfers and stores the original image information so as to reproduce the image in a desired transcription region B on a sheet of copying paper. Finally, a recording section 5 is provided for reading out the contents of the second page memory 2 and for reproducing the image on the recording paper.

For each of these system components, no detailed explanation need to be given for the image input section 4 and the recording portion 5 as they are well-known at the present in the industry. The page memory 1 is a memory having a sufficiently large capacity for storing the original image information or at least that corresponding to that contained or one page of the document. All of the original image information is temporarily stored in the page memory successively in accordance with the order in which the information was received. The page memory 1 may include, for example, an address register for storing address designations or the like. No particular explanation will be made for the units since they can be constructed with ease by well-known means.

For each of the image elements of the original image, it is assumed here that binary bits of image information indicative of either black or white are stored successively from the beginning address in the first page memory 1 corresponding to the scanning order. Of the original image information stored in the page memory 1, only the image information corresponding to the extraction region (A in FIG. 2) for which the address is designated by the image processing section 3 is read out and transferred to the image processing section 3.

For the image information corresponding to the extraction region A, enlargement or reduction processing is performed in the image processing section 3 as required. The image information corresponding to the extraction region or the image information which has been subjected to such processing is transferred to the second page memory 2. The second page memory is a memory similar to the page memory 1 having a capacity for storing the information of the image to be reproduced or at least that corresponding to one page of the copying paper. The image information transferred out from the image processing section 3 is stored at the address in the page memory 2 designated by the image processing section 3. It is thus apparent that the image processing portion 3 designates the address corresponding to a transcribing region B on the recording paper.

In this manner, the information for the image corresponding to the extraction region A of the original image or the information corresponding to the enlarged or reduced image is written into the page memory 2 at the address corresponding to the desired transcription region. If there are two or more extraction regions in the original image, the foregoing operation may be repeated as desired. Upon completion of all of the writing operations into the page memory 2 for the image information to be copied, the information stored in the page memory 2 is successively read out from the beginning address and transferred to the recording section 5. The recording section 5 reproduces the desired image in the transcribing position B on the recording paper in accordance with the image information sent to it from second page memory 2. Means is also to be provided for reading out information from second page memory 2. This means is not specifically shown and described as many such devices are known and are commercially available.

A description will now be given relating to the details of construction and the operation of the image processing section 3.

Figure 3:
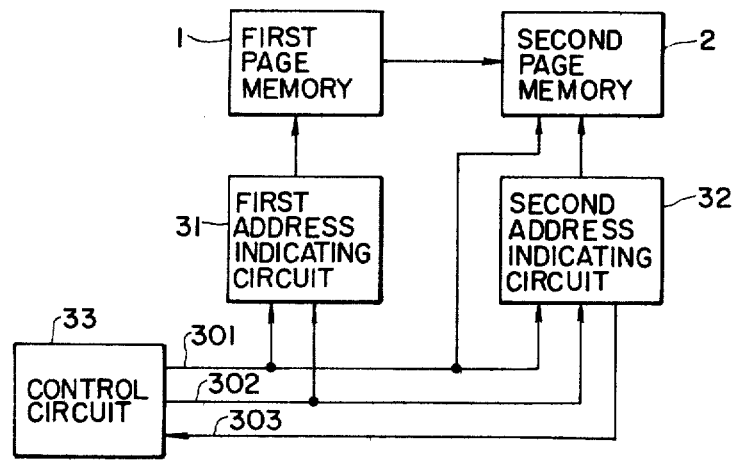
FIG. 3 is a block diagram showing in detail a portion of the system of FIG. 1.

FIG. 3 is a block diagram of an image processor adapted for performing operations such as extracting the image information corresponding to the extraction region A from the first page memory 1 and storing this image information in the second page memory 2 at an address corresponding to the transcription region B. Upon receipt of a start pulse on line 302 from a control circuit 33, an initial set-up is performed for first and second address indication circuits 31 and 32. Following the initial set-up, the address instruction circuits 31 and 32 produce the addresses for the page memories 1 and 2 respectively for each burst of clock pulses on line 301 from the control circuit 33. The page memory is in a write mode (enabled state for writing) on every input of the clock pulses 301 to the page memories 1 and 2.

Consequently, for each burst of the clock pulses on line 301 from the control circuit 33, the information stored in the first page memory 1 at the address designated by the first address instruction circuit 31 is read out and transferred to the second page memory 2 and written therein at the address designated by the second address instruction circuit 32. When all of the image information corresponding to the extraction region A has been transferred to the second page memory 2, an end signal on line 303 is supplied from the address instruction circuit 32 to the control circuit 33 whereupon the control circuit 33 interrupts the flow of clock pulses.

Figure 4:
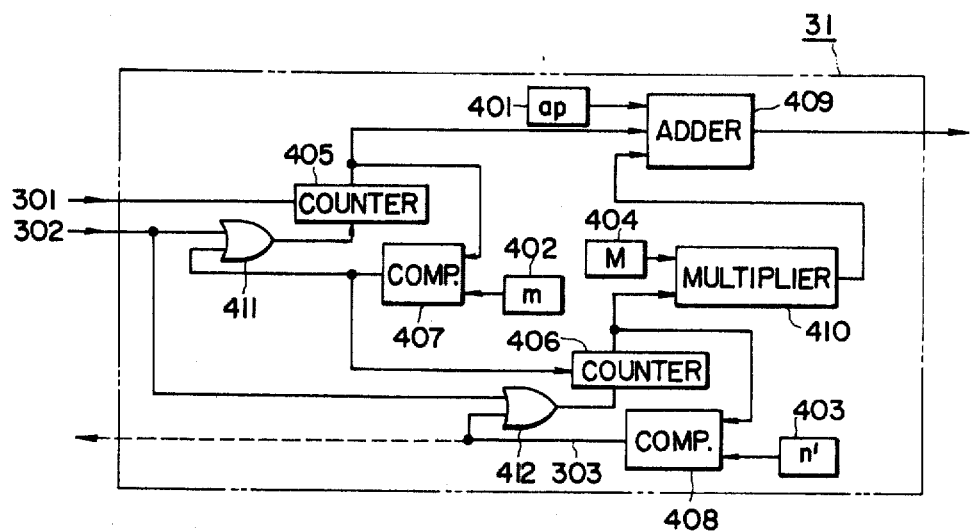
FIG. 4 is a block diagram showing in detail a portion of the system of FIG. 3.

FIG. 4 shows a detailed block diagram of the first address instruction circuit 31 of FIG. 3. The operation thereof will described for a simple transcribing case for which neither enlargement nor reduction is utilized.

Figure 2:
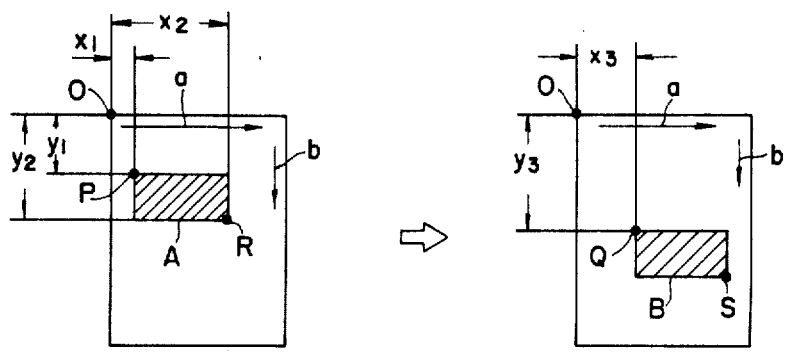
FIG. 2 is a diagram used in illustrating the principles of operation of the present invention.

FIG. 2 illustrates the case in which the image in a rectangular extraction region A on the original document shown within hatched lines is transcribed to the transcribing region B on the copying paper, shown also within hatched lines. Several assumptions are made regarding the operational characteristics of the system.

First, it is assumed that the original document and the recording paper are of the same size and the original document and the recording paper have an equal number M' of image elements in the direction of an arrow a and an equal number N' of image elements in the direction of an arrow b, respectively. Accordingly, the image of the original document is defined by M'×N' number of bits of information each representing either black or white so that the image to be recorded on the copying paper is also defined by the same M'×N' bits of information.

Secondly, the arrows a and b coincide with the main scanning direction and the auxiliary scanning direction, respectively, for the input and output of image information and that the information for each of the image elements in each of the page memories is successively stored in order with respect to the image elements arranged in the direction of the arrow a and that the elements are successively stored in order for each of the image element rows in the direction of the arrow b. In the discussion which follows, a part or the entire portion of the image elements will be referred to simply as an image element row.

Thirdly, the extraction region A and the transciption region B are assumed to be rectangular regions each consisting or M' image elements in the direction of the arrow a and N' image elements in the direction of the arrow b. The designation for a particular region is given by a number k of image element units from the origin in both of directions. If is thus assumed that the address designation for input and output to and from the page memory are given in k bit units.

Fourthly, it is assumed that both an element image P in the extraction area and an image element Q in the transcription region are rectangular image elements A and B, respectively, situated to the lower right of its coordinate points and that the information corresponding to the image element P is stored at the memory location designated by the address ap and that the information corresponding to the image element Q is stored at the memory location designated by the address aq. Since the information input or output is carried out in the k bit units in the page memory according to the third assumption above, the application of the address ap or aq to the memory results in the input or output of k bits of information. With the region designated by k image element units as explained above, the information corresponding to the image element P or the image element Q forms the first packet of information among the k bits of information that are input or output simultaneously (this means the first input or output information when converted into serial signals).

Fifthly, the foregoing M', N', m' and n' are natural numbers satisfying the following conditions:
$M' = k \cdot M$
$N' = k \cdot N$
$m' = k \cdot m$
$n' = k \cdot n$
where M, N, m, n and k are natural numbers.

In FIG. 4, registers 401, 402, 403 and 404 are provided for storing numerical values designating the position and the size of the extraction region A in which the register 401 stores the address ap corresponding to the image element P of the extraction region A, the register 402 stores the number m of addresses required for the input and output of the information corresponding to the m' number of image elements within the extraction region A in the direction of the arrow a, the register 403 stores the number n' of the image elements within the extraction region A in the direction of the arrow b, and the register 404 stores the number M of address designations required for the input and output of the information corresponding to the M' number of the image elements with respect to one image element row.

Counters 405 and 406 are provided for counting input pulses and are adapted to count up to M−1 and N−1 respectively. Comparators 407 and 408 are connected to compare the values counted by the counters 405 or 406 with the values set in the register 402 and 403 and to generate a pulse when both of the values coincide. 409 represents an adder the summation output of which represents the designated address for the first page memory 1. 410 is a multiplier which produces the value indicated at the output of the register 402 and the value indicated at the output of the counter 406. 411 and 412 are OR circuits.

Upon receipt of a start pulse on line 302, the counter 405 produces an output of 0 as an initial value. Thereafter, upon the arrival of every clock pulse on line 301, the counter 405 counts the same and sends the results to the adder 409. Since the adder 409 is simultaneously supplied with the output of the multiplier 410 and the value set by the register 401, it produces its addition results with respect to the three inputs as a page memory designation address. When the start pulse on line 302 is supplied, since the count values on both the counter 405 and the counter 406 are 0 and, accordingly, as the output from the multiplier 410 is 0, and only the register 401 indicates ap, the address designated then is aq.

Thereafter, upon every clock pulse on line 301 to the counter 405, the counter 405 counts up one unit so that addresses $ap+1, ap+2, ap+3, \ldots$ are sequentially generated. In addition, the value indicated by the counter 405 is also supplied to the input of the comparator 407 and a comparison is made with the other input to the comparator 407, that is, the value m set in the register 402. When both of the values coincide, the comparator 407 issues a pulse. The pulse is coupled by way of the OR circuit 411 to the counter 405 to reset the value indicated in the counter 405 to 0 and is also coupled to the counter 406 to increment the value indicated on the counter 406 by 1. The result is coupled as an input to the multiplier 410 where the product with the value M indicated on the register 404 is produced. Consequently, the multiplier 410 changes its output from 0 to M. Since this value is supplied to the input of the adder 409, the adder 409 issues as an output an address of ap+M. As apparent from the foregoing description, the multiplier 410 continues in this fashion increasing its output by M until m address designations have been produced for the input and output of the information relating to the m' number of image elements in the extraction region A in the direction of the arrow a.

Figure 5:
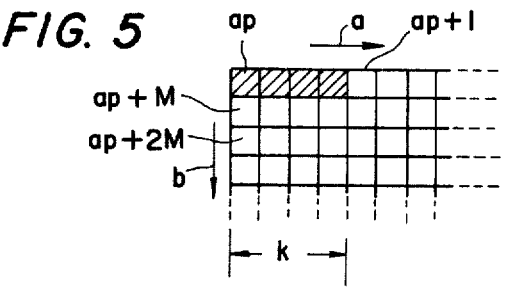
FIG. 5 is a diagram for explaining the generation of addresses in a memory.

As apparent from FIG. 5, the address ap+M secondly produced corresponds to the number k of image elements in total, that is, the image element adjacent to the image element P in the direction of the arrow b and the image elements succeeding from the above image element in the direction of the arrow a. Therefore, the image elements thereafter designated for each clock pulse on line 301 are the m' image elements adjacent to the m' image elements beginning with the image element P in the direction of the arrow a, respectively, along the direction indicated by the arrow b. The m' number of image elements are, of course, designated not individually but collectively in groups of k elements each. Thereafter, the addresses at which are stored the information for the image elements constituting the entire extraction region A are successively generated in the same manner. When the address generation sequence for the m' number of image elements in the direction of the arrow a at the n'−1th position (the first element is reckoned as the 0 position) of the extraction region A has been completed, that is, for each of the m' of image elements forming the n'−1th image element row in the extraction region A, the comparator 407 sends out its n'th pulse in the sequence to the counter 405 upon receipt of the next clock pulse on line 301 and the counter 406 counts the pulse signal to produce an output of n'. Then, the comparator 408 determines that the value n' is equal to the contents of the register 403 and sends out a signal indicating the end of the address generation sequence for the extraction region A.

While the foregoing description relates to the address generating circuit shown in FIG. 4, that is, the first address generating circuit 31 for generating addresses for the first page memory 1 shown in FIG. 3, the address generating circuit 32 for the generating addresses for the second page memory 2 can also be constructed generally in the same way with the exception that the contents of the register 401 in the block diagram shown in FIG. 4 should be aq as shown in FIG. 3, and the address generation end signal on line 303 is externally coupled to the control circuit 33 in the latter case. This is apparent from the fact that the operation as described in conjunction with FIG. 2 is a mere transcribing operation for transferring the information of the extraction region A on the original document with no modification to the copy or transcribing region B on the recording paper with no changes in the number and the arrangement of the image elements of either of the two regions. That is, the number of the image elements constituting the original document and the recording paper or the original image and the transcribed image are M' and N' and the number of image elements in the directions of the arrow a and the arrow b are equal to each other based on the foregoing assumptions and the information corresponding to these image elements is stored in each of the page memories in sequence.

If the number and the manner of arrangement of the image elements to be written onto the recording paper, that is, if the transcribed image is different from that of the original document by the fact that the dimensions of the original document are not equal to those of the recording copy paper, the register 404 in FIG. 4 may adapted to generate the proper address designations required for the input and output of the information corresponding to the m' number of image elements arranged in the direction of the arrow a constituting the new transcribed image. Thus, the foregoing assumptions in no way restrict the function of the reproducing device according to this invention but were made simply to convey an initial understanding of the operation of the apparatus of the invention.

It is believed well within the ability of one having ordinary skill in the art based on the foregoing explanation to extract only the image information relevant to the extraction region A from the first page memory, store that image information in the second page memory at the address corresponding to the transcribing region and reproduce a copy image based thereon. A description of a device for designating the extraction region of the original image and the transfer position on the recording paper will be given below.

While an explanation has been given for transcribing an image from the extraction region on the original paper to a desired position on the recording paper at an enlargement factor of 1, enlargement and reduction of the image may be required upon transcription. This case will be described in detail hereinafter.

Figure 6:
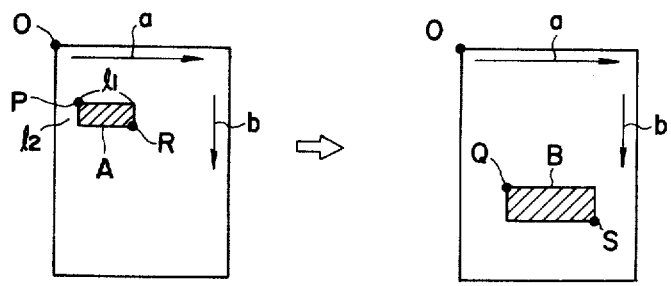
FIG. 6 is a diagram used in illustrating principles of the present invention in the case where the image is enlarged or reduced.
Figure 7:
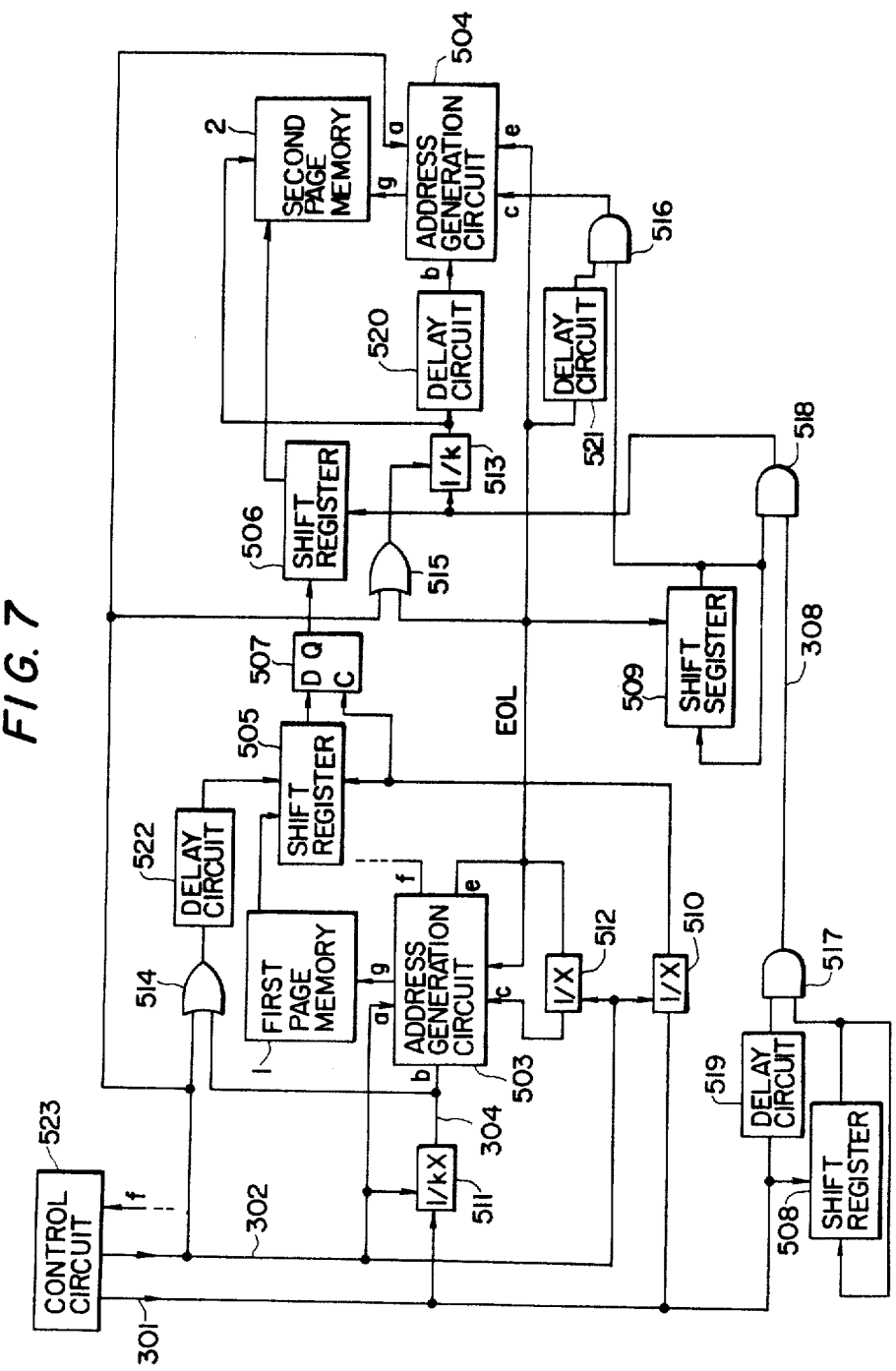
FIG. 7 is a circuit diagram showing in detail a portion of the system of FIG. 1 in the case where the image is enlarged or reduced.

FIG. 6 is a plan view conceptually showing the process for extracting only the image information corresponding to the extraction region from the first page memory, processing the image information thus extracted so as to enlarge or reduce the extracted region at a specified ratio (the process being hereinafter referred to for simplification as enlargement) and storing the image information corresponding to the copy region obtained by the above process in the second page memory at a designated address. FIG. 7 is a block schematic diagram of a device for carrying out the such a process.

FIG. 6 shows the operation of enlarging the image corresponding to a part of or the entire designated region A of an original document by a factor of x in accordance with a designated enlargement ratio and recording the magnified image at a designated position or transcription region B on the recording paper to thus obtain a desired copy image.

A description will first be given of the image information enlargement system employed in the image processing section 3 of FIG. 1.

Generally, there are an infinite number of enlargement ratios such as 0.05, 0.13, 1.05, 4.87, 5.99, etc. They are still infinite in number even if the permissible ratios are restricted to a 0.05 pitch as 0.05, 0.10, ... 5.25, 9.05, ... etc. If the enlargement ratio range is restricted to be below 4, it yet contains nearly 80 ratios in 0.05 pitch. As a practical matter it is thus necessary to provide a method of further restricting the number of available ratios.

The following equation forms a basis for the solution to this problem. For a ratio x greater than 1, the ratio may generally be expressed as $x=([x]+\beta)\cdot\alpha$ or, $\alpha=x/([x]+\beta)$, where $\alpha$ is a correction coefficient, $[x]$ is the integer part of x, that is, the greatest integer not exceeding x, and $\beta$ is a natural number. Since it is advantageous to set $[x]+\beta$ to a small value in order to enlarge the image with as high a fidelity as possible, the above equation may rewritten as follows setting $\beta$ as 1:

$$x=([x]+1)\cdot\alpha$$

$$\alpha=x/[x]+1$$

For $[x]=3$ for $x=3.33$, for example, $3.33=4\cdot\alpha$, and $\alpha=0.8325$, that is, enlargement by a factor of 3.33 is enlargement by a factor of 4 and a further magnification by the factor of 0.8325. Since enlargement by an integer is a common practice, what is needed is the provision of a process for enlarging by the factor of $\alpha$.

The value for $\alpha$ may be represented as:

(i) when $0 < x < 1$; $\alpha = x$ and $0 < \alpha < 1$
(ii) when $1 < x < 2$; $\alpha = x/2$ and $\frac{1}{2} < \alpha < 1$

.
.
.
.

when $n < x < n + 1$; $\alpha = x/(n + 1)$
and $1/(n + 1) < \alpha < 1$

Figure 8:
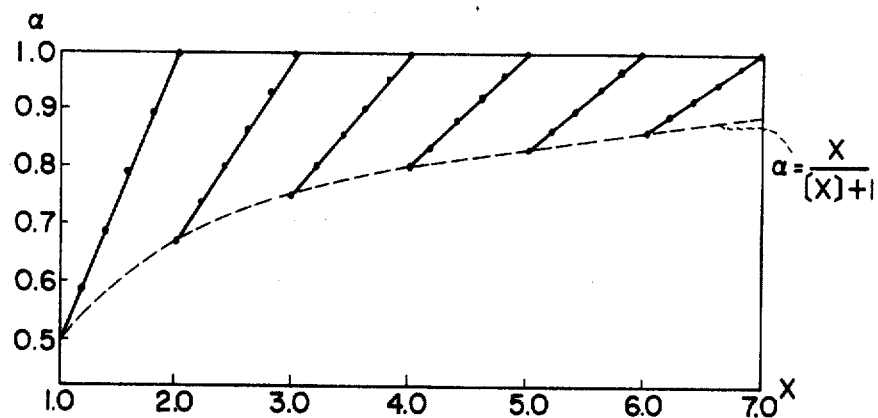
FIG. 8 is a graph used in illustrating the principles of the enlargement and reduction in accordance with the invention.

FIG. 8 shows the above relations. As can be seen from the figure, it is necessary to finely divide the value of $\alpha$ in the vicinity of 1 if the value of x is restricted to integer values. However, if $\alpha$ were to be set at an even pitch, the enlargement ratio could be set only coarsely as the value of x increases. The values of x and $\alpha$ must be determined taking the above points into consideration.

Since the enlargement ratio x is restricted to be within a certain range for normal usage, the choice of the correction coefficient $\alpha$ may be based thereon. Assuming, for example that x is in a range below 4 and that the ratio may be varied at a pitch of about 0.2, it can be seen that minimum pitch for the correction coefficient $\alpha$ can be satisfied by an approximate value of 0.05.

The following description assumes that 18 ratios are provided, namely $\alpha=0.05, 0.10, \ldots 0.90$ and 0.95.

The values for $\alpha$ used in the reduction process are 0.05-0.95 and the value for $\alpha$ used for the correction coefficient for enlargement is in the range of 0.5-0.95. As will be described below, in accordance with the invention, a minor number of data points are removed by sampling among a large number of data points for the range of $\alpha \times 0.05$-0.5 and separately for the range of $\alpha = 0.5$-0.95. As the process is basically the same for both ranges, only that for $\alpha = 0.05$-0.5 will be described.

The values for $\alpha$ selected are first expressed by an integer ratio R:S as follows:

| | |
|---|---|
| 0.05 → 20:1 | 0.50 → 10:3 |
| 0.10 → 10:1 | 0.35 → 20:7 |
| 0.15 → 20:3 | 0.40 → 5:2 |
| 0.20 → 5:1 | 0.45 → 20:9 |
| 0.25 → 4:1 | 0.50 → 2:1 |

Then, for each ratio R:S corresponding patterns A and B are provided for respective values of $\alpha$ as will be explained below. For each of the patterns, data is sampled and utilized in the "1" position if $\alpha$ is below 0.5 and removed from that position if $\alpha$ is above 0.5.

In the analysis below, the symbol $\Gamma$ represents the number of "0's" present between two "1" bits adjacent to each other when the two patterns are arranged in a one-dimensional arrangement, that is, with the bits of A and B placed next to each other in a single serial string. For example, $\Gamma_{AB}$ represents the number of "0's" present between the "1" bits for the pattern B placed after the pattern A and $\Gamma_{AB}$ represents the number of "0's" present between the "1" bits for the pattern A repeated next to itself. The A and B patterns are chosen such that the ratio at which "0" and "1" appear when the two patterns A and B are alternated either regularly as ABAB . . . or at random is equal to the coefficient of correction. The arrangement of the patterns A and B at random provides an advantage of preventing the generation of moire image interference.

Some examples of possible values are given below:

$\alpha = 0.25, 0.75\ (4:1)$
A = 0100    $\Gamma_{AA} = \Gamma_{BB} = 3$
B = 0010    $\Gamma_{AB} = 4, \Gamma_{BA} = 2$   $\Gamma$ average = 3
$\alpha = 0.20, 0.80\ (5:1)$
A = 00100   $\Gamma_{AA} = \Gamma_{BB} = 4$
B = 01000   $\Gamma_{AB} = 3, \Gamma_{BA} = 5$   $\Gamma$ average = 4
$\alpha = 0.40, 0.60\ (5:2)$
A = 01010   $\Gamma_{AA} = \Gamma_{BA} = 2$
B = 10010   $\Gamma_{AB} = \Gamma_{BB} = 1$   $\Gamma$ average = 1.5
$\alpha = 0.10, 0.90\ (10:1)$
A = 0000100000   $\Gamma_{AA} = \Gamma_{BB} = 9$
B = 0000010000   $\Gamma_{AB} = 10, \Gamma_{BA} = 8$   $\Gamma$ average = 9
$\alpha = 0.30, 0.70\ (10:3)$
A = 0100100100   $\Gamma_{AA} = \Gamma_{AB} = 3$
B = 0100010010   $\Gamma_{BB} = \Gamma_{BA} = 2$   $\Gamma$ average = 2.5
$\alpha = 0.05, 0.95\ (20:1)$
A = 00000000010000000000   $\Gamma_{AA} = \Gamma_{BB} = 19$
B = 00000000001000000000   $\Gamma_{AB} = 20, \Gamma_{BA} = 18$
                          $\Gamma$ average = 19
$\alpha = 0.15, 0.85\ (20:3)$
A = 00010000001000000100   $\Gamma_{AA} = \Gamma_{BB} = 5$
B = 00100000010000001000   $\Gamma_{AB} = 4, \Gamma_{BA} = 6$
                          $\Gamma$ average = 5.5
$\alpha = 0.35, 0.65\ (20:7)$
A = 01001001010010010010   $\Gamma_{AA} = \Gamma_{BB} = 2$
B = 01001001001010010010   $\Gamma_{AB} = \Gamma_{BA} = 2$
                          $\Gamma$ average = 1.875
$\alpha = 0.45, 0.55\ (20:9)$
A = 01010101001010101010   $\Gamma_{AA} = \Gamma_{BB} = \Gamma_{AB} = \Gamma_{BA} = 2$
B = 01010101010010101010   $\Gamma$ average = 1.3
$\alpha = 0.50\ (2:1)$
A = 01        $\Gamma_{AA} = \Gamma_{BB} = 1$
B = 10        $\Gamma_{AB} = 0, \Gamma_{BA} = 2$
              $\Gamma$ average = 1.0

For Example for $\alpha = 0.25$, 0.75, the sequence AA is 01000100 which has three zeros between "1's" so that $\Gamma_{AA}=3$. The sequence AB is 01000010 with four zeros between "1's" so that $\Gamma_{AB}=4$.

For each value of $\alpha$ given above, the binary values of A and B are chosen such that the calculated value of $\Gamma$ average is related to the values of A and B by:

$$(\Gamma\ \text{average})\cdot(S+1)\simeq R.$$

It is to be borne in mind that average remains the same when the two series are alternated randomly as is recommended for eliminating moire pattern interference and that $\Gamma$ average represents the probability that any one bit will be removed from the initially enlarged sequence.

The procedure for enlargement by a factor of 2.22 will be described as an example.

Since $x = 2.22 = 3 \times (2.22/3) = \times 0.74$, the correction coefficient $\alpha = 0.74$. That is, enlargement is first effected by a factor of 3 and then the result is reduced by a factor of 0.74. As an approximation, $\alpha = 0.74 \simeq 0.75$ and $\alpha = 0.75 = 15/20 = \frac{3}{4}$ so that to perform the required reduction one bit is thinned from four bits. The process for one direction will be shown as an example in which the resulting pattern B enlarged by the desired factor or a close approximation thereto. It is assumed here as above for each of the patterns that A = 0100 and B = 0010, and the thinning instruction AB is in the order of ABAB . . . . Assuming the k bits of image data upon which the procedure is to be performed is 0011001110, the data enlarged by a factor of three by repeating each bit three times is:

000000111111000000111111111000.

Aligning the enlarged data with the repeated AB pattern and dropping those bits of the enlarged data when they are adjacent a "1" in the AB pattern:
Enlarged data: 000000111111000000111111111000
Repeated AB pattern: 010001001000010010000100000100
Resulting pattern: 000001111100001111111100

By performing the operation in the same manner also in the other direction (including thinning by a line unit and a bit unit) a two-dimensional enlargement process by the factor of a non-integer can be performed.

A description will next be given for both of the construction and the operation of the circuits shown in FIG. 7 and succeeding figures. In the drawing, 1 and 2 represent the first page memory and second page memory, respectively. The image information to be stored in the first and the second page memories is assumed to be stored from the beginning address in the same sequence in which each of the image elements is scanned. The scanning is conducted by a main scanning operation for successively inputting and outputting the information relevant to the image elements for the image element row including the number M' of image elements arranged in the direction of the arrow a in FIG. 6 and by an auxiliary scanning operation for successively moving the image element row in the main scanning operation in the direction shown by the arrow b on the original image and the copy image. The input and output of the image information to the page memory are performed by the k bit unit, and the information for the k bit unit is hereinafter referred to as one word.

Figure 9:
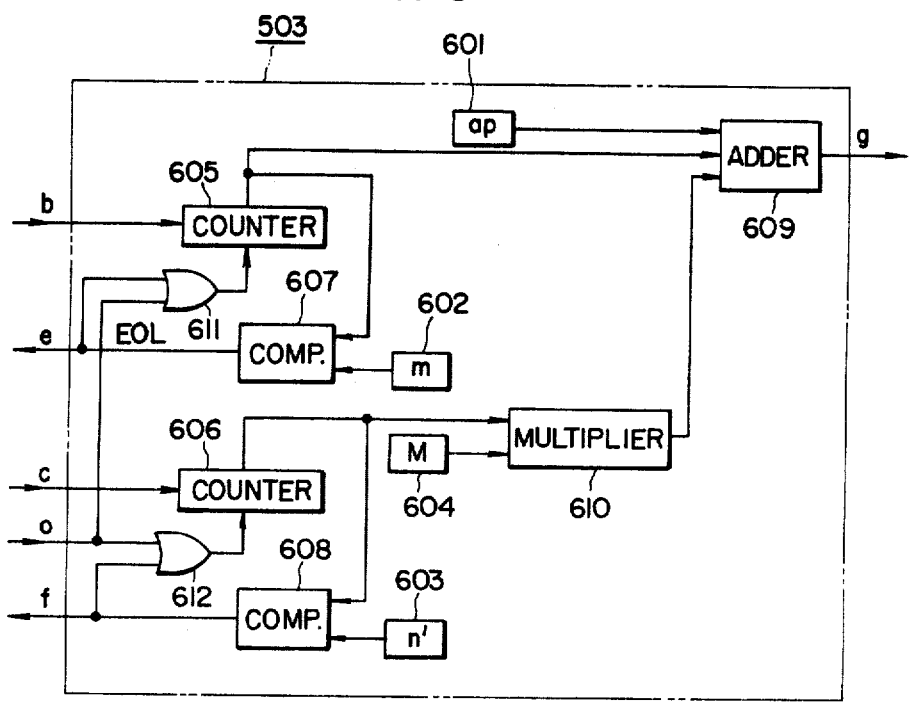
FIGS. 9, 10 and 13, 14 are diagrams showing portions of the circuit of FIG. 7 in detail.

503 and 504 are address generation circuits for producing addresses for the first and the second page memories respectively. The address designation circuit 503 is constructed as shown in FIG. 9.

The address generation circuit 503 which corresponds to the address generation circuit 31 of FIG. 4, is obtained by modifying the circuit arrangement shown in FIG. 4, so that the output of the comparator 407 is not directly applied to the counter 406, but is applied externally to the circuit 31 and also to the OR circuit 411. A further signal coupled in from outside the circuit and applied directly to the counter 406. As used in FIG. 9, 601, 602, 603 and 604 are registers, 605 and 606 are counters, 607 and 608 are comparators, 609 is an adder, 610 is a multiplier and 611 and 612 are OR circuits. The contents stored in the registers 601, 602, 603 and 604 are ap, m, n', and M respectively, as in FIG. 4. The value ap represents the address at which is stored the information corresponding to the image element P situated at the uppermost left of the extraction region A shown in FIG. 6 and k is the number of bits of information that are transferred simultaneously to the page memory, m represents the number of addresses required for the input and output of the m' number of image elements arranged in the direction of the arrow a in the extraction region A, n' represents the number of image elements arranged in the direction of the arrow b in the extraction region A, and M represent the number of times of address generation required for the input and output of the information in segments of k bits for the M' number of image elements arranged in the direction of the arrow a of the original image to and from the page memory.

Accordingly, the above address generation circuit 503 performs the following operations. Signals are supplied from the outside the circuit for controlling such operation. Upon receipt of a start pulse signal on line a in FIG. 9, the counters 605 and 606 are initialized to 0. Consequently, the output of the multiplier 610 is also 0 and the output g from the adder 609 is equal to that of the register 601, that is, ap. An address is, therefore, generated for storing the information corresponding to the image element P in the extraction region A. Since the counter 605 counts the number of the clock pulses on line the address generated on the output from the adder 609 increases successively in unitary steps as $ap+1, ap+2, \ldots$. Upon receipt of the $m^{th}$ clock pulse, since the output count value of the counter 605 coincides with that of the register 602, the comparator 607 generates a pulse signal. The pulse signal is referred to as EOL signal (end of line) hereinafter meaning that the address generation required for reading out the information corresponding to the m' number of image elements arranged in the direction of main scanning in the extraction region A (the direction shown by the arrow a in FIG. 6) from the page memory 1 has been completed.

The EOL signal is coupled out to the outside as an output signal on line e and, at the same time, coupled to the input of the OR circuit 611 to reset the counter 605 again to 0. If the signal on line c is not supplied at the generation of the EOL signal, since the counter 606 and the multiplier 610 do not change their output values, the address generated is ap. Accordingly, the addresses generated thereafter are the same are the same as those corresponding to the image element row read out immediately before.

If the input signal on line c is supplied simultaneously with the generation of the EOL signal, the counter 606 increases its output value by 1 whereupon the multiplier 610 changes its output from O to M. Following this, the multiplier 610 increases its output value by M for each increase of the output count value of the counter 606. For a multiplier output of M, the address generated then on output lines g is therefore $ap+M$, which is just the address storing 1 word information for a set of k image elements situated just below the image element P along the main scanning direction as can be seen in FIG. 6. Thereafter, for the clock pulses on line b which are coupled to the counter 605 the generated address changes as $ap+M+1, ap+M+2, \ldots$, meaning that addresses are generated such that the information corresponds to the image element row adjacent to the image element row including the m' number of image elements previously read out in the auxiliary scanning direction.

As has been brought out in the foregoing description, if the pulse signal on line c is supplied upon generation of the EOL signal from the comparator 607, the image element row corresponding to the information read out from the page memory 1 is advanced by 1 image element in the auxiliary scanning direction from the image element row read out immediately before and, if no signal is supplied, the address corresponding to the information stored for each of the image elements in the image element row read out immediately before is again generated. Generation of the address for the image information in the extraction region A is performed by succesively repeating such operation.

Then, upon receipt of the $n'^{th}$ pulse at the counter 606, the value accumulated in the counter 606 coincides with the value stored in the register 603 and the comparator 608 generates a pulse signal. The pulse signal is hereinafter referred to as an END signal which indicates that the reading operation for the image information corresponding to the extraction region A from the page memory 1 has been completed. This signal is coupled out externally as a signal on line f indicating that all the information stored at the address of the second page memory 2 on the copying region after a predetermined process has been read out.

Figure 10:
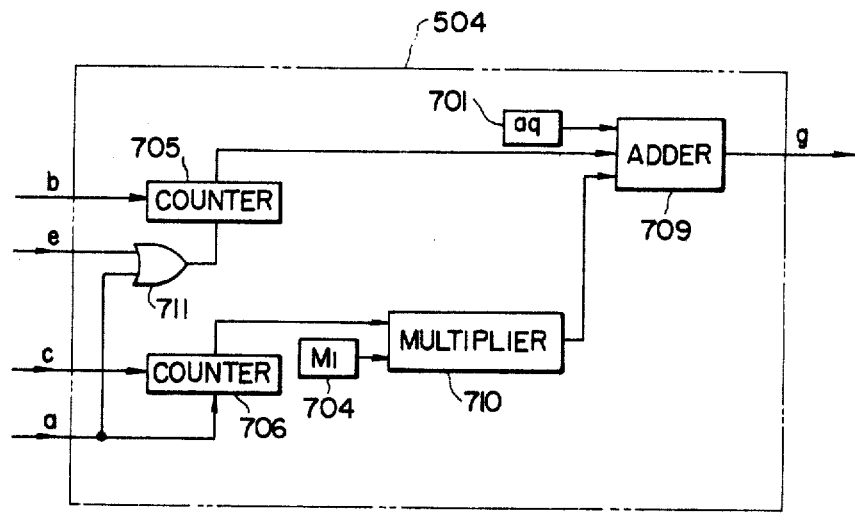

The address generation circuit 504 is constructed as shown in FIG. 10. As apparent, the circuit 504 corresponds to the address generation circuit 503 in FIG. 9 except the registers 602 and 603 and comparators 607 and 608 are not required and thus no output signal such as on lines e and f are present. 701 and 704 are registers in which the values of aq and $m_1$ are respectively stored. 705 and 706 are counters, 709 is an adder, 710 is a multiplier and 711 is an OR circuit which operates together as follows.

Upon supply of a start pulse signal on line a, the counters 705 and 706 are set to an initial state of 0. Accordingly, the output result of the multiplier 710 is also 0 and the content at the output of the adder 709 is equal to that on the output of register 701, that is, aq. The aq represents the address at which is stored the word image information the image element Q that is situated to the uppermost left in the copying region B shown in FIG. 6. This value forms the address signal on lines g that is initially produced. Then, as the counter 705 counts the number of clock pulses b supplied successively, the output signal on lines g keep increasing successively as $aq+1, aq+2, \ldots$ as in FIG. 9. This continues until an EOL signal on line e is supplied to the OR gate 711 upon which the value produced by the counter 705 is set to O by the EOL signal.

If a pulse signal on line c is supplied simultaneously at that time, the contents of the counter 706 changes from 0 to 1 and the contents of the multiplier 710 changes from O to $M_1$ based on the above change. $M_1$ represents the number of addresses required for transferring the information corresponding to the $M_1'$ image elements arranged in the main scanning direction on the copy image to the second page memory by the k bit unit (that is, by the word unit). $M=M_1$ when the arrangement of the image elements constituting the original image and the copy are equal. Accordingly, the address designated by the output signal on lines g is $aq+M_1$ which is the address utilized with the single word information from the k image elements arranged from the image element situated just below the image element Q in the main scanning direction in FIG. 6 while the succeedingly addresses $aq+M_1+1$, $aq+M_1+2$, . . . generated in accordance with the arrival of the clock pulses on line b correspond to the image element row advanced by one image element from the image element row written immediately before in the direction of the auxiliary scanning.

By repeating the foregoing operation, generation of addresses corresponding to the entire copy region is performed. The image processing means shown by the diagram of FIG. 7 is adapted to perform image processing by carrying out a series of operations for extracting only the image information corresponding to the extraction region from the first page memory 1 so as to enlarge the image corresponding to the extraction region by a factor of x followed by storing the image information obtained as the result of the above process in the second page memory 2 at addresses corresponding to the copy region so that the image corresponding to the extraction region is enlarged at first by a factor of X and then reduced by a factor of $\alpha$ to thereby obtain an image enlarged by the factor of x.

Description will next be given for the operation of the image processing means of FIG. 7. Upon generation of the start pulse on line 302 initiating the start of a series of operations, the address instruction circuits 503 and 504 produce addresses ap and aq respectively as described above. Upon receipt of the start signal, frequency dividers 510, 511, 512 and 513 are set to an initial state of 0. Each of the frequency dividers thereafter counts the pulses on their inputs returning to the initial state upon receipt of the $X^{th}$, $kX^{th}$ and $k^{th}$ pulses, respectively, while repeating the above described operations after each initialization. The frequency divider 511 produces an output pulse signal simultaneously with the input of a first pulse while the other frequency dividers 512, 513 and 514 produce output pulses simultaneously with the input of $kX^{th}$, $X^{th}$ and $k^{th}$ pulses respectively.

The start signal 302 is also supplied by way of the OR circuit 514 and a delay circuit 522 to a shift register 505 serving there as a clock signal to clock in the one-word information at the output of the data gate of the page memory 1 to the shift register. The shift register 505 is a parallel-in-serial-out type k-bit shift register and the information input to it is just the single word (k bits) of information stored at the address ap designated by the address instruction circuit 503. In this state, clock pulses 301 are produced by the control circuit 523. The clock pulses 301 are supplied to the input of the counter 510 from which a pulse train divided by X (hereinafter referred to as a shift signal) 305 is produced and supplied to the shift register 505 and the flip-flop 507.

On receipt of each the shift signal on line 305, the shift register 505 sends out the information image stored therein bit-by-bit to the flip-flop 507 and the flip-flop 507 changes the state of an output Q depending on the input image information and retains the state of the output Q until the next shift signal 305 is received. The image information indicated on the output Q of the flip-flop 507 is further sent to the shift register 506. The shift resister 506 is a k-bit shift register of the serial-in-parallel-out type which stores for each pulse signal (hereinafter referred to as a shift signal) on line 309 the state indicated on the output Q of the flip-flop 507. The shift signal on line 309 is produced by delaying the clock pulse 301 through a delay circuit 519 and further gating it through AND circuits 517 and 518. The output from the shift register 508 is supplied to the other input of the AND circuit 517 and the output of the shift register 509 is supplied to the other input of the AND circuit 518. Reduction information corresponding to the correction coefficient $\alpha$ has previously been stored in shift registers 508 and 509.

The contents of the above two shift registers may be the same or different. The reduction information is composed of patterns including an adequate number, two or more than two, of reduction patterns for the correction coefficient $\alpha$ for sampling or thinning and arranging them at random (the foregoing patterns A and B, for example, continue in a proper order).

The shift registers 508 and 509 are connected such that the information stored therein is recirculated. It is preferred to choose the capacity of the shift registers great enough so that the regularity of the sampling or thinning operation is negligible. The clock pulse on line 301 produced by the control circuit 523 is supplied by way of the delay circuit 519 to the AND circuit 517 as well as to the shift register 508. Then, the pulse train 308 produced at the output of the AND circuit 517 is equivalent to that prepared by sampling or thinning the clock pulses on line 301 in accordance with the correction coefficient. The EOL signal produced by the address instruction circuit 503 is supplied to the shift register 509 which in turn changes its output state each time the EOL signal is received depending on the reduction information previously stored therein.

Accordingly, if the output state of the shift register 509 is in the "0" state, the pulse train from line 308 is not coupled through the AND circuit 518 and the image information indicated on the output Q of the flip-flop 507 is not stored in the shift register 506. If the output state of the shift register 509 is in the "1" state, the pulse train 308 forms a shift signal on line 309 by way of the AND circuit 518 to supply the signal on the output Q from the flip-flop 507 as the image information to the input of the shift register 506.

As explained above, the EOL signal supplied to the shift register 509 indicates that the address generation sequence has been completed as required for reading out the information corresponding to the m' number of image elements arranged in the main scanning direction in the extraction region A from the page memory 1. Therefore, the output state of the shift register 509 does not change during the process for the information corresponding to one image element row in the extraction region.

Accordingly, if the output state of the shift register 509 is at a "1" level, the number of pulses of the shift signal on line 309 supplied to the shift register 506 is equal to that produced by multiplying the number of pulses of the shift signal 305 supplied to the shift register 505 and the flip-flop 507 by the factor of X and effecting sampling or thinning in accordance with the reduction information corresponding to the correction coefficient $\alpha$. Consequently, the information supplied to the input of the shift register 506 represents the image as enlarged by the factor of $x = X \cdot \alpha$ corresponding to the information read out from the first page memory 1 in the main scanning direction.

The image information stored in the shift register 506 is transferred in one word units (k bits per word unit) to the second page memory 2 and stored at the address designated by the address generation circuit 504. This is performed by the generation of a pulse signal by the counter 513 that counts the number of pulses to the shift signal 309 for each unit of k pulses to put the page memory 2 into an enabled state for writing while the pulse signal generated by the counter 513 is supplied by way of the delay circuit 520 as an input signal b to the address generation circuit 504 causing the address generation to the address generation circuit 504 causing the address generation circuit 504 to generate the address at which the writing operation is next to be performed.

The address generation circuit 503 generates an address corresponding to the information to be next read out upon receipt of the pulse signal 304 sent out from the frequency divider 511 as the input signal b. As above, the frequency divider 511 is adapted to count the clock pulses and to generate the pulse signal 304 each time kX pulses have been counted. Consequently, the address pulses have been counted. Consequently, the address generation circuit 503 changes the output address each time kX pulses have been counted. The pulse signal 304 is also supplied by way of the OR circuit 514 and the delay circuit 522 to the shift register 505 to input the single word information data corresponding to the address designated by the address generation circuit 503 and coupled to the shift register 505.

When all of the information corresponding to the first image element row in the main scanning direction of the extraction region A as shown in FIG. 6 has been read out in accordance with the procedures described above, the EOL signal is produced and out from the address generation circuit 503. The EOL signal is supplied to the OR circuit 611 of the address generation circuit 503 and the frequency divider 512 while the output of the frequency divider 512 is supplied as a signal on line c to the counter 606 of the address generation circuit 503. As a result, the address generation circuit 503 reads out the data for the m' image elements arranged in the main scanning direction in the extraction region A shown in FIG. 6 x times. This results in enlargement of the original image by a factor of x in the main scanning direction. Consequently, if the EOL signal is not the $X^{th}$ signal, the image element row corresponding to the information which was read out immediately previous is read out and, if it is the $X^{th}$ signal, the next image element row in sequence advanced in the direction of the auxiliary scanning is read out thereafter. Further, the EOL signal is applied by way of the OR circuit 515 to the frequency divider 513 to put it into an initial set state and is also supplied as an input signal on line e and by way of the delay circuit 521 and the AND circuit 516 as an input signal on line c to the address generation circuit 504. The output from the shift register 509 is supplied to the other input of the AND circuit 516. As already described, the shift register 509 changes its output state in accordance with the correction coefficient α stored therein upon receipt of the EOL signal.

Consequently, if the shift register 509 assumes a 37 1" output state simultaneously with the receipt of the EOL signal at the shift register 509, the EOL signal is furnished as the input signal on line c to the address generation circuit 504. The address produced thereafter by the address generation circuit 504 therefore corresponds to the image element row advanced from the image element row written immediately before by one image element in the auxiliary scanning direction. Since the input signal on line c is not supplied if the shift register 509 is in the "0" state, the address generation circuit 504 is set so that the image element row written immediately before is produced again. However, since the AND circuit 506 also cuts off the shift signal on line 309, the information corresponding to one image element row read out from the page memory 1 thereafter is not written into the page memory 2. Specifically, the information corresponding to each of the image element rows arranged in the main scanning direction in the extraction region A is read out each X times while the line therein corresponding to the correction coefficient α is subjected to sampling or thinning whereby the information image corresponding to the extraction region A is enlarged by the factor of x=X·α in the auxiliary scanning direction. The sampling or thinning for the image elements is conducted in accordance with the reduction information corresponding to the correction coefficient α with respect to each of the image element rows in the main scanning lines constituting the image enlarged by the factor of x. It will now be apparent that the information representing the image prepared by enlarging the image corresponding to the extraction region on the original image by the factor of x is stored at the address corresponding to the copy region of the second page memory 2.

The completion of the above procedures is indicated by the END signal on line f from the address generation circuit 503. A detailed explanation for the END signal on line f has already been given and when the END signal f is received at the control circuit 523, the control circuit stops the production of the clock pulses on line 301 whereby the series of operations described thus far are completed.

While an explanation has been given for the case where the enlargement ratio is greater than 1, that is, for the case of enlargement, it will be apparent that the sampling or thinning operation can be performed by applying the correction coefficient α directly to the original image signal of the first memory for the reduction process when the enlargement ratio is smaller than 1 since [x] is 0. In the foregoing descriptions relating to a preferred embodiment of the image processing means of the invention, all of the position and sizes of the extraction region of the original image, the positions of the copy region on the copy image, as well as the enlargement ratio for the enlargement process are considered to have been previously set. It is, however, desired that they be externally settable and not fixed in a commercialized reproducing device.

As already described, the embodiment in FIG. 7 is an example of the structure for the image processing means in which the transferred image is enlarged and in which the position and the size of the extraction region in the above operation are determined by the values stored in the three registers 601-603 provided in the address generation circuit 503. If the position of the extraction region A on the original image shown in FIG. 6 is represented by the image element P and the size of the extraction region A is given by the length $l_1$ along the main scanning direction and the length $l_2$ along the auxiliary scanning direction, the values corresponding thereto form the contents ap, m and n' of the registers 601, 602 and 603 in the block diagram of the address generation circuit 503 shown in FIG. 9.

In addition, the position of the transcribing or copy region B on the copy image can also be represented by the image element Q and the position of the image element Q is determined by the value stored in the register 701 in the block diagram of the address generation circuit 504 for the second page memory shown in FIG. 10. Accordingly, by the provision of means for supplying a numerical value corresponding to the contents of the required operation from ourside the circuit to the input of the above register, that is, a region designation means such as an externally operable set of switches, the position and the size of the extraction region within the original image and the position of the copy region within the copy region can be set for each of the operations.

Figure 11:
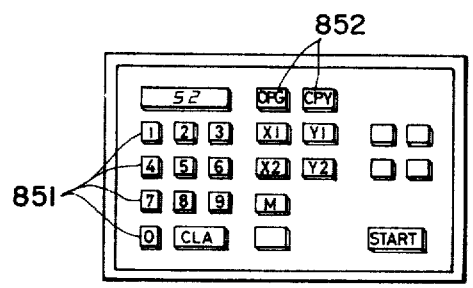
FIG. 11 is a plan view of a keyboard device suitable for use with the present invention.

The operator console schematically shown in FIG. 11 preferably constitutes a part of such a region designation means. An operator can key in the numerical value corresponding to a desired operation by way of a set of switches 851 arranged on an operation console. The operator can further determine by way of auxiliary keys 852 which functions are to be performed thereby transferring the selected numerical values to the appropriate registers.

Figure 12:
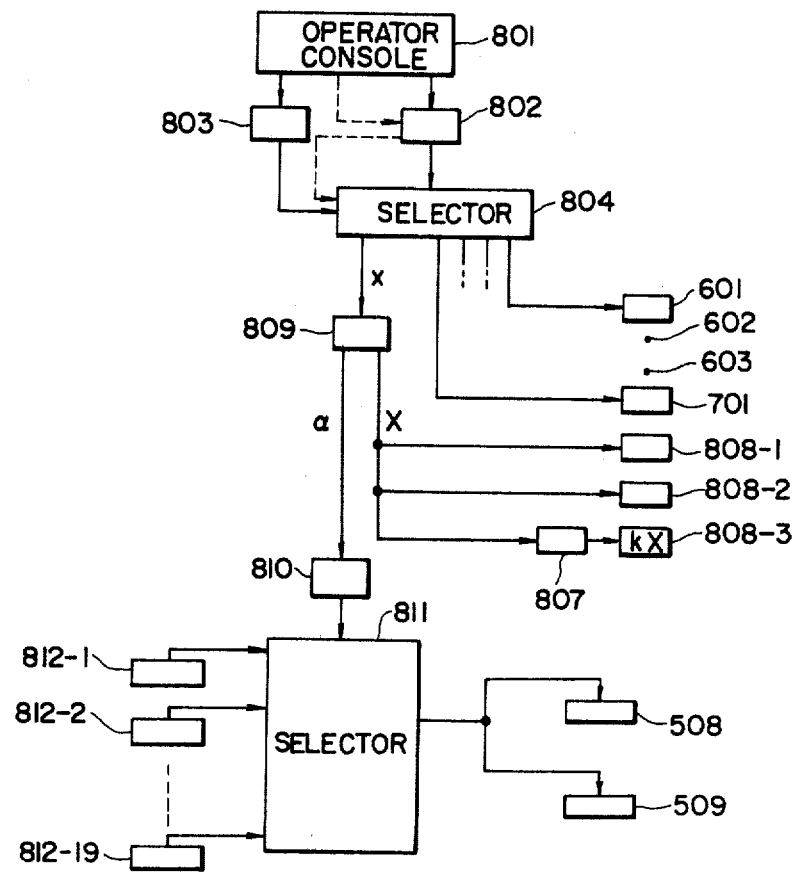
FIG. 12 is a circuit diagram of a circuit used in conjunction with the keyboard device of FIG. 11.

FIG. 12 shows the structure of the region designation means of FIG. 11 in block diagram form. In the diagram, are shown an operator console 801, registers 802, 601, 602, 603, 701, 808-1, 808-2 and 808-3, selector control circuit 803 and 810, selectors 804 and 811, operation circuits 807 and 809, shift registers $802_{1-19}$, 508 and 509. The operator keys in the numerical information which is coupled directly to the register 802 by operation of the digit switches 851 on the operator console and determines what is to be done with. The selector control circuit 803 selects the destination of the numerical information stored in the register 802 depending on the instruction given and accordingly controls the selector 804. Each of the registers 601, 602, 603 and 701 is as shown in FIG. 9 and FIG. 10. Thus, when any of the registers 601, 602, 603 and 701 is designated, the numerical information stored in the register 802 is coupled to the designated register.

FIG. 12 also shows the structure of an enlargement ratio designation means which determines the enlargement ratio for each operation where the enlargement process is required. If the numerical information coupled to the register 802 by way of the digit switches on the operator console 801 expresses an enlargement ratio as indicated by the auxiliary keys, the selector control circuit 803 controls the selector 804 so that the numerical information in the register 802 is transferred to the operation circuit 809. The operation circuit 809 calculates, with respect to the numerical information x, the numerical values X and α represented by:

$$X = [x] + 1$$

$$\alpha = x/X.$$

The value of X obtained is transferred to the registers 808-1 and 808-2 and the multiplication circuit 807. The multiplication circuit 807 calculates the product kX from the supplied numerical value X and k with the results stored in the register 808-3. Each of the above registers 808-1, 808-2 and 808-3 is located inside of each of the frequency dividers 510, 511 and 512 as shown in FIG. 7.

Figure 13:
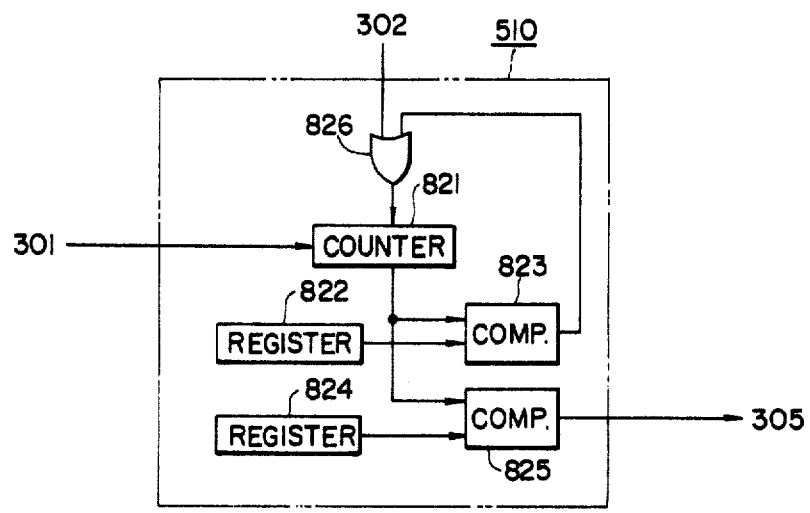
Figure 14:
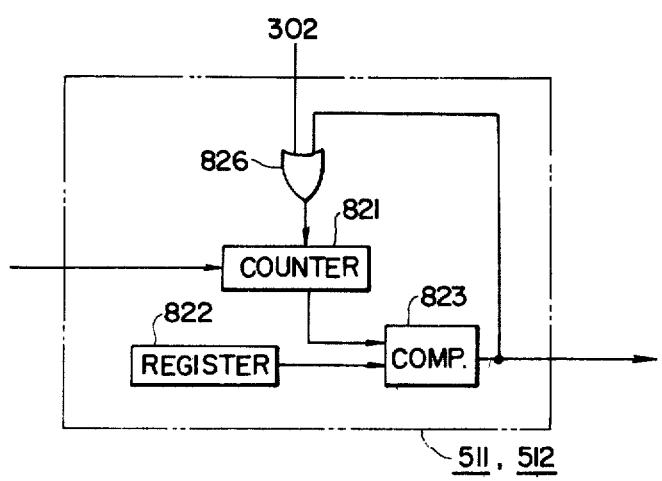

FIG. 13 is a block diagram of the frequency divider 510 and FIG. 14 is a block diagram of the frequency dividers 511 and 512. In these two figures, those portions having the same structure and function carry the same reference numerals. 821 is a counter for counting the number of pulses of the supplied pulse train, 822 is a register, and 823 is a comparator which compares the output count value of the counter 821 and the contents stored in the register 822 and which issues a pulse signal when two values coincide. This pulse signal places the counter 821 in its initial set state. 824 is a register storing a constant value of 1 and 825 is a comparator. The above two devices 824 and 825 are not provided in the frequency dividers 511 and 512. This is due to the fact that the frequency divider 510 is different from the other frequency dividers 511 and 512 in that it sends out a pulse signal externally upon receipt of a first pulse.

The remaining numerical information calculated during operation of the circuit 809 (correction coefficient) is transferred to the selector control circuit 810 where the reduction ratio nearest to the calculated value of α is selected from the available ratios α1 ... α19 previously calculated and the selector 811 is controlled in accordance with the selected value.

Reduction information representing 19 correction coefficients α are pre-calculated, for example, by dividing the distance between 0.05–1.0 at a 0.05 pitch, and are stored in the shift registers $812_{1-19}$ with the outputs from each of the shift registers 812 coupled to the selector 811. The selector 811 selects the output from the shift register that stores the reduction information αk nearest the calculated numerical value α as calculated by the selector control circuit 810. Consequently, the reduction data expressing the reduction ratio αk is stored in the shift registers 508 and 509. It will be apparent that the enlargement ratio can be selected for each operation by the above ratio designation means as only the frequency dividers 510, 511 and 512 and the shift registers 518 and 519 are used for determining the enlargement ratio among the components shown in the block diagram of FIG. 7.

By the provision of the region designation means and the ratio designation means as explained above, the designation of the enlargement or reduction is carried out as specified by the operator in accordance with the inputs specified by the digit keys and the auxiliary keys on the console.

For the keying-in of this information which is to be accomplished, the efficiency of the operation can significantly be improved if the operator can observe the original image and the extraction region on the original image simultaneously and can rapidly recognize the numerical values supplied as inputs by way of the digit keys based on the result of the observation. The same is true for the copy image and the copy region on the copy image.

Figure 15:
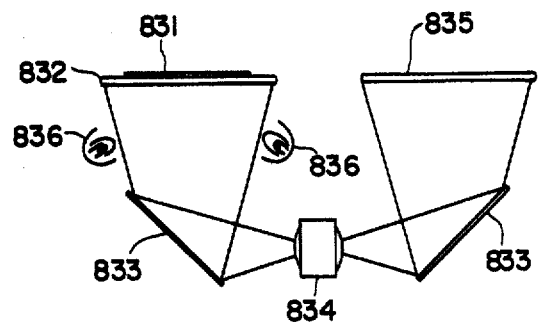
FIG. 15 is a diagram showing in cross-section an original image displaying means in accordance with the invention.
Figure 16:
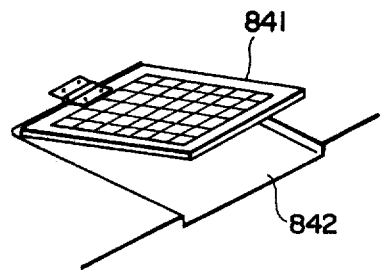
FIG. 16 is a perspective view diagram showing a transcribing position designating device used with the invention.

FIG. 15 and FIG. 16 show schematically the construction of an original image display means and a copy image display means, respectively, that enables such observation.

In FIG. 15, 831 is an original document carrying an original image on its lower surface and 832 is a platen glass on which the original document is placed. 833 is a mirror, 834 is a lens and 836 is an exposure lamp which together constitute an image projection means. 835 is a screen on which the original image of the document is projected. It is convenient to attach ruled lines and numerical value indicators on the screen so that the position of each point of the projected image can be read out directly in a coordinate form. Thus, the operator can read the points sufficiently accurately for designating the position and the size of the extraction region on the original image projected over the screen, that is, the coordinate for the two points P and R shown in FIG. 3 as well as the numerical values set by way of the digit keys and the auxiliary keys.

However, since the key-input numerical values are not the values that are actually stored in the registers 601, 603, 603 and 701 in FIG. 12, a calculation circuit is required for calculating the value to be indicated on the registers from the numerical values showing the input coordinates. Such a calculation circuit can be provided at the site of the register 802 in FIG. 12. The calculation circuit has includes a plurality of registers which store temporarily the numerical value inputs produced by the digit keys in the registers designated by way of the auxiliary keys in the calculation circuit. With all of the required numerical information stored in the registers upon commuencement of the calculation, the calculation circuit calculates the numerical values to be transferred to and the stored in registers 601, 602 and 603. In this manner, numerical values ap, m and n' expressing the position and the size of the extraction region are recorded in each of the registers 601 and 603.

In the designation of the transcription region, calculation, storage and display are also effected with these registers in the same manner. Specifically, by key-inputting the numerical information regarding the coordinates of the point Q shown in FIG. 6 from the console, the numerical value aq is determined which is subsequently stored in the register 701. The designation means for the transcription position on the copy image may, however, be constituted as shown in FIG. 16. The copy image display means includes a coordinate display plate 841 having a transparent plate furnished with ruled lines and numerical values and a mounting bed 842. A sample of the copy paper (not shown) is placed between the two. The position of the transcription region, that is, the points of the coordinates corresponding to the point Q in FIG. 3 and FIG. 6 can be read by way of the coordinate display plate 841 using the furnished ruled lines and numerical values.

The equation for the calculations executed in the above-described calculation circuit may be different depending on the choice of coordinates. For example, where the coordinate points are each situated to the upper left of the original image and the copy image as shown in FIG. 3 and FIG. 6 and for scale graduation at integer numerical values of k number of image elements at a minimum (nominal) unit both in the direction of the main scanning (arrow a) and the auxiliary scanning (arrow b), ap, m and n' relative to two sets of numerical values $(x_1, y_1)$ and $(x_2, y_2)$ supplied as the coordinates of the points P and R are calculated by the following equations:

$$ap = x_1 + kMy_1$$

$$m = x_2 - x_1$$

$$n' = k(y_2 - y_1).$$

For the set of numerical values $(x_3, y_3)$ which are the coordinates of the point Q, aq is given by the equation:

$$aq = x_3 + kMy_3.$$

As apparent from the foregoing description, according to this invention, an image in any extraction region on an original image can be transcribed to any designated position on a copy image and the image can be enlarged and reduced with ease upon transcription. As can further be appreciated upon enlargement and reduction of the image, enlargement and reduction at a desired ratio can easily be accomplished by the provision of relatively small number of correction coefficients while generation of moire image interference is effectively suppressed resulting in no irregularities in the reproduced image.

What is claimed is:

1. An image transcribing device comprising; an image input portion for scanning an original document for converting an image on the original document into binary binary information signals representing the image, a first page memory for storing said binary information signals, a second page memory, an image processing section for transferring the binary information stored in said first page memory at addresses corresponding to a predetermined region of the original document to the second page memory and stored at addresses corresponding to a predetermined transcribing region for a reproduced image, a recording section for copy reproducing the stored binary information of said second page memory on a recording sheet, means for observing the image on the original for selecting the predetermined region of the original document and for assigning a position on a recording sheet at which the image is to be transcribed, and means for generating addresses corresponding to said predetermined transcribing region from said assigned position.

2. An image transcribing device as set forth in claim 1 wherein said image processing section comprises means for converting said electrical signals representing the image on the original document and stored in the first page memory into electrical signals representing the stored image enlarged by a factor of a natural number equal to a sum of an integer part of a desired enlargement ratio and a predetermined natural number, means for reducing the size of the enlarged image by accepting one part and rejecting another part of the electrical signals representing the magnified image at a ratio of the desired enlargement ratio to said sum to the desired enlargement ratio, and means for transferring the electrical signals thus obtained to the addresses corresponding to the transcribing region in the second page memory whereby the designated region of the original image is enlarged or reduced at the desired ratio and reproduced in the transcribing region on the recording sheet.

3. An image enlargement and reduction system wherein an original image is subjected to a main scanning and a secondary scanning for conversion to a time sequence binary electric signal, the binary electric signal being thereafter processed so as to obtain an enlargement or reduction of the original image, comprising means for enlarging the original image by factor of a natural number constituting the sum of the integer part of a desired enlargement factor and a predetermined natural number, and means for reducing the enlarged image by a factor equal to the ratio of said sum to the desired enlargement factor to thereby obtain an image enlarged by the desired enlargement factor.

4. An image enlargement and reduction system as set forth in claim 3 characterized in that, in correspondence to the ratio between the natural number constituting the sum wherein said reducing means comprises means for storing digital data representing predetermined compensating factors, said compensating factors being determined in correspondence to the ratio between said natural number and said sum and means for removing portions of said binary electric signal in accordance with the value of one of said compensating factors chosen in accordance with the desired enlargement factor.

5. An image enlargement and reduction system as set forth in claim 4 wherein said compensating factors comprise a series of binary numbers having no regularity.

6. An image enlargement and reduction system as set forth in claims 4 or 5 wherein said predetermined natural number is 1.

* * * * *